United States Patent [19]

Kitano et al.

[11] Patent Number: 4,782,926
[45] Date of Patent: Nov. 8, 1988

[54] CLUTCH BRAKE

[75] Inventors: Seiichi Kitano, Shijounawate; Yasunobu Fukatani, Hirakata; Masaaki Asada, Ibaragi, all of Japan

[73] Assignee: Kabushiki Kaisha Daikin Seisakusho, Osaka, Japan

[21] Appl. No.: 21,066

[22] Filed: Mar. 3, 1987

[30] Foreign Application Priority Data

Mar. 4, 1986 [JP] Japan .................................. 61-46786

[51] Int. Cl.⁴ .............................................. F16D 67/02
[52] U.S. Cl. ................................ 192/13 R; 192/107 R
[58] Field of Search ............ 188/18 A, 73.1, 218 XL, 188/250 B, 259; 192/13 R, 18 R, 107 R

[56] References Cited

U.S. PATENT DOCUMENTS 3,763,977 10/1973 Sink ................................ 192/18 R X
4,186,826 2/1980 MacKendrick et al. .... 188/218 XL X

FOREIGN PATENT DOCUMENTS

58/81234 10/1982 Japan .

Primary Examiner—Duane A. Reger
Attorney, Agent, or Firm—Armstrong, Nikaido, Marmelstein & Kubovcik

[57] ABSTRACT

A clutch brake having a brake assembly interconnected to a rotatable shaft through means of driving function and a cover assembly provided with an external friction surface and carried rotatably in relation to said brake assembly; characterized by that a coned disc spring is interposed in said cover assembly, and a friction plate composing said cover assembly is pressed on a friction member composing said brake assembly by means of said coned disc spring.

7 Claims, 5 Drawing Sheets

CLUTCH BRAKE

BACKGROUND OF THE INVENTION

(Industrial useful field)

This invention relates to a clutch brake, and specifically to a clutch brake which has a brake assembly interconnected to a rotatable shaft through means of driving function and a cover assembly provided with an external friction surface and carried rotatably in rotation to said brake assembly, and which is especially utilized to a non-synchronous powerful transmission.

(Prior art)

Generally, as illustrated in FIG. 4, this type of clutch brake is interposed between a clutch 1 and a transmission 4, a power from the clutch 1 is transmitted through an input shaft 3 to the transmission 4, and the power from the clutch 1 is disengaged by an actuation of a release bearing 2 through an operation of a clutch operation mechanism (not shown). A cap 5 is fastened to a clutch 1 side face of the transmission 4, a clutch brake A usually rotates in such a manner as rotating integrally with the input shaft 3 and contacts with the irrotatable release bearing 2 and the cap 5 due to a movement of the release bearing 2 toward the transmission 4 when the clutch 1 is disengaged, thus a braking force is applied on the input shaft 3 from the release bearing 2 and the cap 5 through a cover assembly (not shown) and a brake assembly (not shown) which compose the clutch brake A.

An embodiment of this type of clutch brake is disclosed in Japanese un-examined patent publication No. 58-81234 and U.S. patent application Ser. No. 318,729, for example. In this embodiment, a friction torque generated between a cover assembly C and a brake assembly B is adjusted by a wave spring 7 illustrated in FIG. 5.

(Problem of prior art)

In case when the foregoing wave spring 7 is used as the means for adjusting the friction torque generated between the cover assembly C and the brake assembly B, a characteristic curve of a friction allowance of friction member M in relation to a torque T becomes as shown by FIG. 6. There has been such a problem that a limit characteristic as a torque limiter has been unstable when the friction member had been worn out from an initial setting state.

Namely, a spring force of the wave spring 7 increases linearly with an increase in the friction allowance M, so that a limit torque Tr of FIG. 6 increases with an increase in the spring force of the wave spring 7.

(Measure for solving the problem)

A clutch brake having a brake assembly interconnected to a rotatable shaft through means of driving function and a cover assembly provided with an external friction surface and carried rotatably in relation to said brake assembly; characterized by that a coned disc spring is interposed in said cover assembly, and a friction plate composing said cover assembly is pressed on a friction member composing said brake assembly by means of said coned disc spring.

DETAILED DESCRIPTION OF THE INVENTION

(Embodiment)

Figure 1:
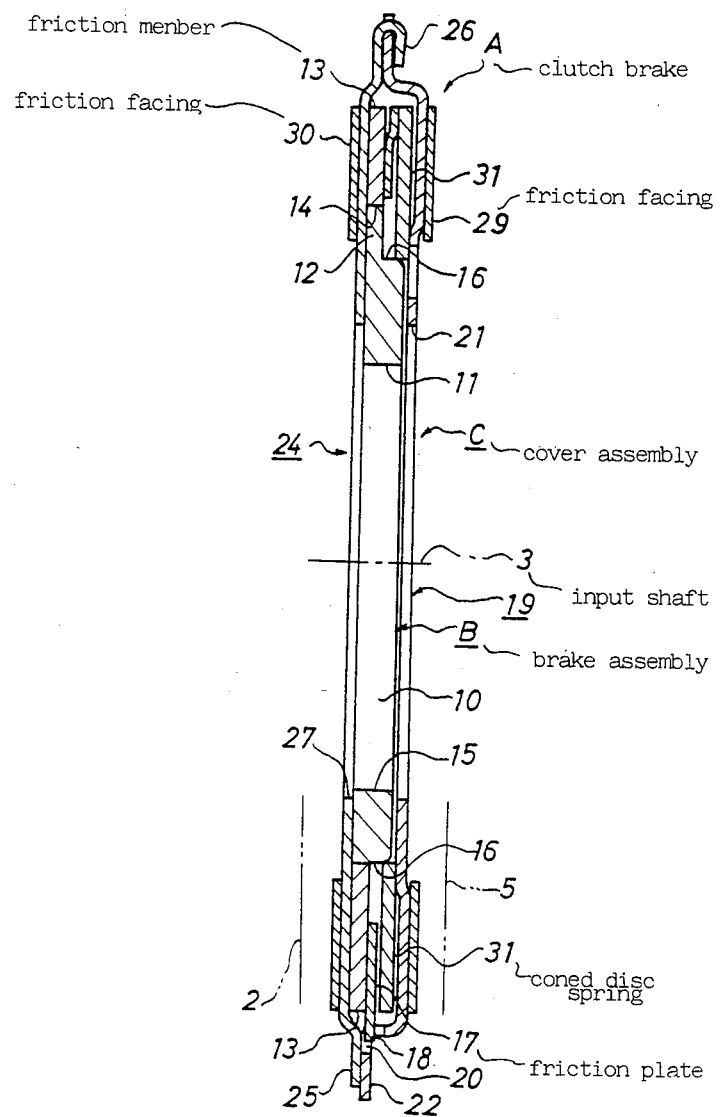
FIG. 1 is a sectional view of an embodiment of the present invention taken on a line I—I of FIG. 2.
Figure 2:
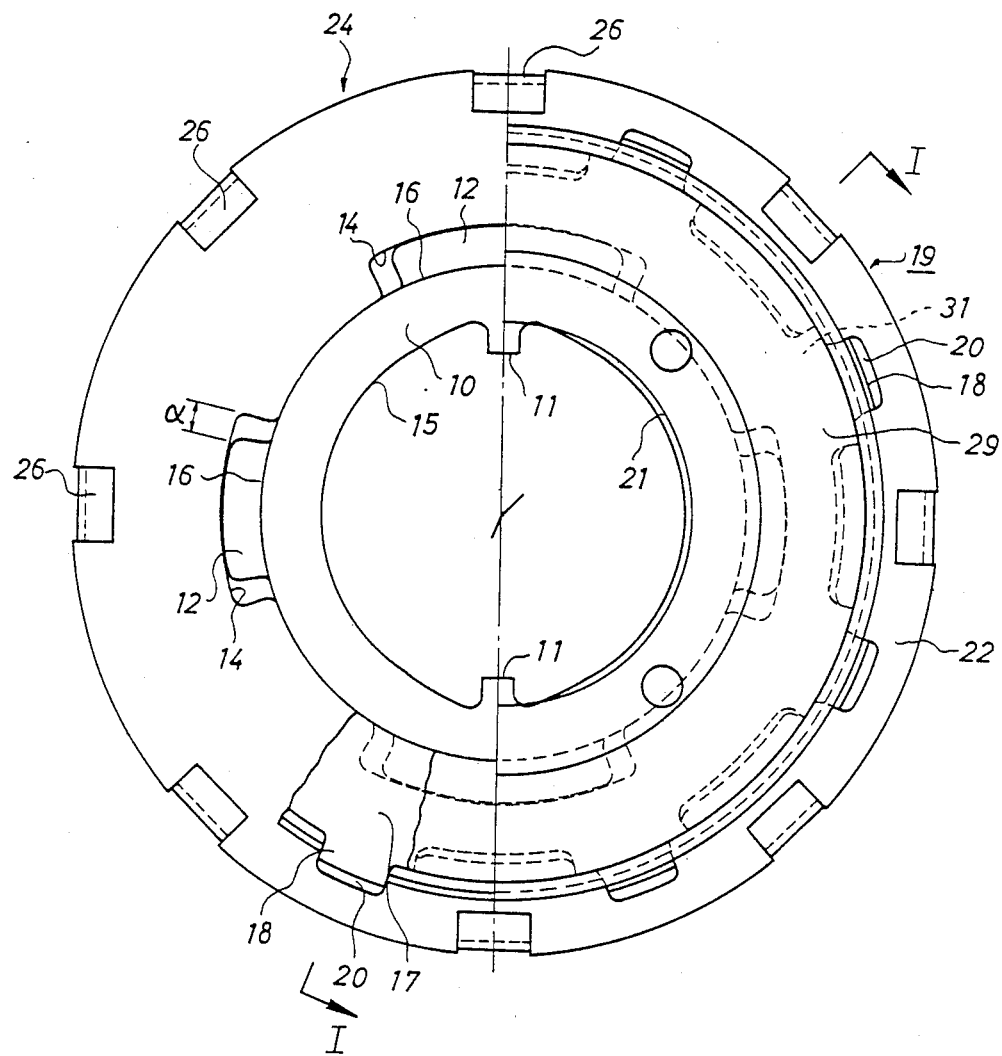
FIG. 2 is a partially fragmental front elevation.
Figure 4:
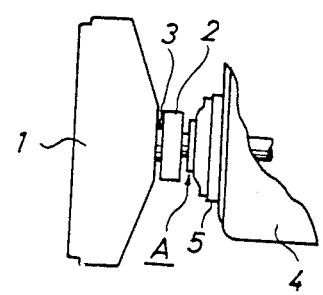
FIG. 4 is a partially fragmental schematic side view of a conventional embodiment.
Figure 5:
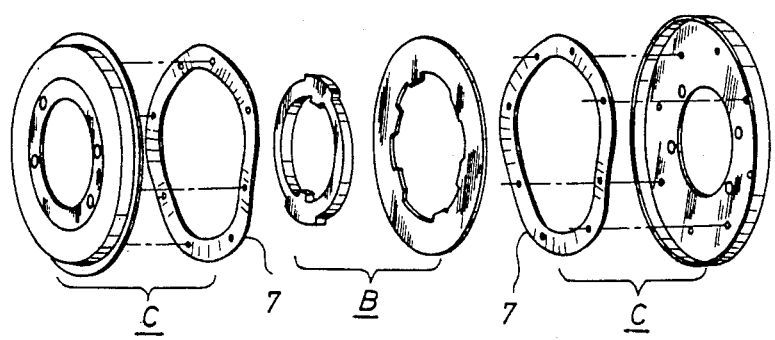
FIG. 5 is an oblique exploded view.

In FIG. 1 and FIG. 2 showing an embodiment of this invention, components having same symbols as those of the prior art of FIG. 4 and FIG. 5 are components corresponding thereto and only different points therebetween will be described hereunder.

10 is an approximately annular hub fitting onto an input shaft 3 (only its center line being shown) and always rotating together with the input shaft 3, and an insertion hole 15 for inserting the input shaft 3 is formed on its inner peripheral part. Two projections 11 opposing each other, for example, are formed at specified positions on the insertion hole 15 and these projections 11 mesh with the input shaft 3 so that the hub 10 can rotate in the same direction as the input shaft. Projections 12, meshing with an annular friction member 13 located at an outer peripheral side of the hub 10, are formed at four 90° spaced places on an outer peripheral face of the hub 10. A recession 14 formed on an inner peripheral face of the friction member 13 meshes with the projection 12 with some clearance α (FIG. 2) left therebetween. Further, a stepped part 16 with which an inner peripheral face of a coned disc spring 31 described later contacts is formed on a left side of the hub 10 in FIG. 1. A brake assembly B is composed of the hub 10 and the friction member 13 made, for example, of a sintered material.

As for a cover 19 at a right side of FIG. 1, an insertion hole 21 for inserting the input shaft 3 is formed on its shaft axis side and a flange 22, which is a joining part with a cover 24, is formed on its outer peripheral part.

As for the cover 24 at a left side of FIG. 1, an insertion hole 27 for inserting the input shaft 3 is formed on its shaft axis side and a flange 25, which is a joining part with the cover 19, is formed on its outer peripheral part, and at the same time plural (eight, for example) hooks (folded parts) 26 for joining with the cover 19 are formed out of an outer peripheral edge of the flange 25 with equal spaces left therebetween. Annular friction facings 29 and 30 are bonded to outer sides of the cover 19 and the cover 24 respectively so that a friction can be transmitted through contact of the release bearing 2 with the cap 5.

A hole 20 with which a projection 18 of a friction plate 17 meshes is formed at specified plural positions of an inner peripheral part of the flange 22 of the cover 19, and the friction plate 17 is adapted to rotate integrally with the cover 19 through this meshing of the projection 18 with the hole 20. A friction torque can be generated between the brake assembly B and a cover assembly C by means of friction between the friction plate 17 and the friction member 13 and friction between the cover 24 and the friction member 13.

The coned disc spring 31 is interposed between the friction plate 17 and the cover 19 so that the friction plate 17 can be pressed on the friction member 13 adequately. At an initial stage of installing the coned disc spring 31, the spring is axially compressed to some extent (FIG. 1).

Figure 2A:
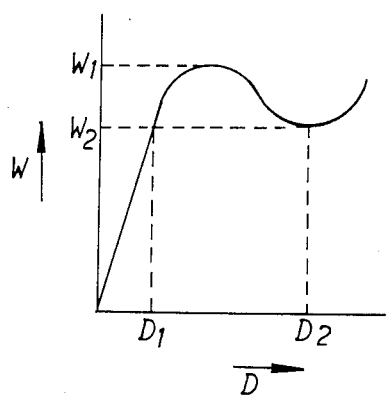
FIG. 2a is a graph showing a spring characteristic of a coned disc spring.

As has been well known, coned disc spring 31 has a characteristic of spring force W in relation to deflection D as shown in FIG. 2a, in which the characteristic presents a spring force W which does not exceed the maximum spring force W1 but lies within a limit of spring force W2 near to the maximum spring force W1 over a wide range of deflection from D1 to D2 before and after exerting the maximum spring force W1.

Figure 3:
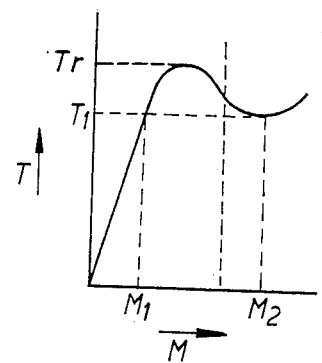
FIG. 3 is a graph showing a characteristic of a friction allowance of friction member in relation to a torque.
Figure 6:
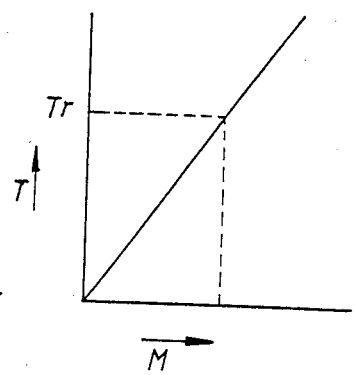
FIG. 6 is a graph showing a characteristic of a friction allowance of friction member in relation to a torque.

Function will be described hereunder. When a clutch 1 (FIG. 4) is in an engaged state, the clutch brake A rotates freely but integrally with the input shaft 3. When the release bearing 2 is actuated toward a right side of FIG. 4 to cause a disengaged state of the clutch 1 (FIG. 4), the clutch brake A is urged toward the transmission 4 side by the release bearing 2 to generate the friction torque between the cap 5 and the release bearing 2 and the friction facings 29 and 30 through contact of the brake with the release bearing 2 and the cap 5 which is an irrotational member. This friction torque is transmitted from an inside surface of the cover 24 to the friction member 13 and further from the cover 19 through the friction plate 17 to the friction member 13, so that a braking torque acts on the brake assembly B side. From the brake assembly B the braking torque acts on the input shaft 3 fitting irrotationally in the brake assembly B, and an inertia is braked to ease a shifting of gear. A magnitude of the friction torque acting from the friction plate 17 side to the friction member 13 side is controlled by the characteristic of the coned disc spring 31 shown in FIG. 2a, and the characteristic curve of friction allowance of friction member M in relation to torque T as shown in FIG. 3 is obtained from the characteristic of the coned disc spring 31. As compared with the characteristic curve shown in FIG. 6 for the wave spring 7, the friction torque presents a stable limit characteristic at the initial setting stage and at the time of the friction member being worn out, and an excellent characteristic becomes obtainable.

Namely, for more details, the torque characteristic from the limit torque Tr to the torque T1 can be generated over a wide range of friction allowance M ranging from the friction allowance M1 to M2. Incidentally, the torque T1 is small than but close to the limit torque Tr so that no trouble will occur in a performance of the clutch brake within the range between the limit torque Tr and the torque T1.

Further, a torque T larger than the limit torque Tr will not be transmitted even when the friction allowance M changes. And even if a friction torque of more than a specified value acts on the clutch brake, a slippage will occur between the friction member 13 and the cover 24 to stably prevent the friction torque from being transmitted.

(Effect of the invention)

In the clutch brake according to the present invention, the coned disc spring 31 is interposed in the cover assembly C and the pressing force of the friction plate 17 on the friction member 13 composing the brake assembly B is adjusted by the coned disc spring 31, so that the friction torque characteristic developed between the brake assembly B and the cover assembly C can be shaped into the characteristic curve as shown in FIG. 3 which develops the excellent performance for both the friction torque transmission at the initial setting stage and the limit characteristic at the time of the friction member being worn out. Therefore, the performance as the torque limiter can be stabilized to a maximum extent.

Further, a torque T larger than the limit torque Tr will not be transmitted even when the friction allowance M changes. And even if a friction torque of more than a specified value acts on the clutch brake, a slippage will occur between the friction member 13 and the cover 24 to stably prevent the friction torque from being transmitted. Therefore, the excellent friction torque characteristic can be obtained even after the friction facings 29 & 30 have been worn out.

Moreover, in this invention, since the friction plate 17 is interposed between one coned disc spring 31 and the friction member 13, such a disadvantage that two coned disc springs must be precisely designed and assembled so as to be finely balanced can be improved, as has been encountered in the prior arts described in the foregoing Japanese un-examined patent publication No. 58-81234 and U.S. patent application Ser. No. 318,729 in which two coned disc springs are used combinedly. Furthermore, such a disadvantage as two coned disc springs striking each other can be avoided.

(Another embodiment)

Figure 7:
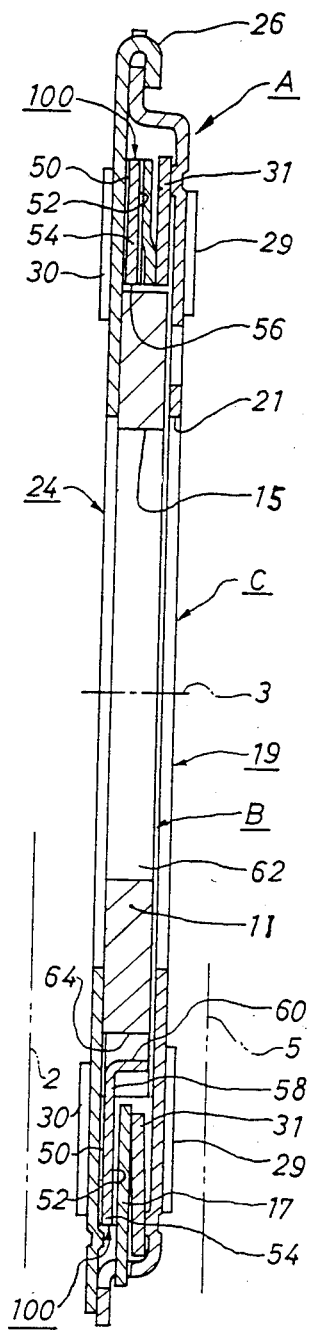
FIG. 7 is a vertical sectional view showing another embodiment.

Another embodiment as shown by FIG. 7 will be described hereunder. In the embodiment of FIG. 7, the friction member 13 described in the embodiment of FIG. 1 is altered into a friction flange 100. The reason why the friction member is altered is as follows.

It has conventionally been required for the friction member to select a material having the following four properties: wear resistance, heat resistance, shock resistance and high friction coefficient. However, it has been very difficult to form a component completely providing the above four properties by using one kind of material. For this reason, it has conventionally been common to use a sintered material, for example, as the friction material. Therefore, the friction material 13 is also made of the sintered material in the embodiment of FIG. 1.

However, the sintered material is inferior in the high friction coefficient among the above four properties so that it provides a small friction coefficient. Accordingly, it becomes necessary to set a spring load of the coned disc spring 31 large in order to obtain a constant torque. On the other hand, the covers 19 and 24 will be deformed if the spring load of the coned disc spring 31 is set too large. Further, the sintered material is expensive so that it will cause an increase in cost of the clutch brake, if used.

Therefore, in an embodiment shown by FIG. 7, the friction member is composed of a first friction member 50 rubbing against an inside surface of the cover 24 and a second friction member 52 rubbing against the cover 24 side of the friction plate 17, and the friction flange 100 is formed by sandwiching an annular core material 54 in between the first and second friction materials 50 and 52.

Figure 9:
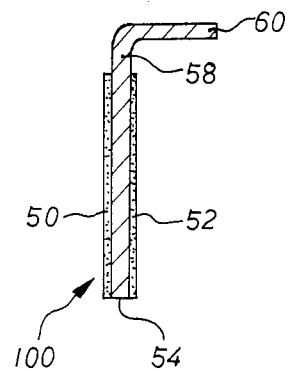
FIG. 9 is a sectional view taken on a line IX—IX of FIG. 8.

Namely, as shown by FIG. 9 in details, the first friction material 50 made of a comparatively thin hard organic material is fastened to a left side surface in the figure of the annular core material 54 made of a steel plate, and the second friction material 52 made of a thin hard organic material is fastened to a right side surface of the core material 54 in the same manner. Incidentally, as has conventionally been well known, the steel plate is superior in the friction resistance and the shock resistance and the hard organic material is superior in the wear resistance and the friction coefficient.

As described above, the material superior in the wear resistance and shock resistance is selected for the core material 54 and the material superior in the wear resistance and having a high friction coefficient is selected for the first and second friction materials 50 and 52, thereby it becomes possible to allot the foregoing four necessary conditions to each member for obtaining the friction flange completely satisfying every condition. Also in this case, the same effect as the embodiment of FIG. 1 can be obtained by using the coned disc spring 31.

In FIG. 7, both the first and second friction materials 50 and 52 are formed into annular shapes. Further, they are made for example of the hard organic material having a high friction coefficient. The first and second friction materials 50 and 52 are bonded by adhesive agent etc. to the core material 54 which will be described later. Moreover, they can be molded into a solid component by means of a baking process etc.

The embodiment of FIG. 7 shows such an example that the first and second friction materials 50 and 52 are bonded to the core materials 54 by using the adhesive agent, and in this example the first friction material 50 rubs against the inside surface of the cover 24. And, the second friction material 52 rubs against the cover 24 side of the friction plate 17. Consequently, friction torques generated between the inside surface of the cover 24 and the first friction material 50 and between the friction plate 17 and the second friction material 52, are transmitted from the both friction materials 50 and 52 through the core material 54 to the input shaft 3.

Further, even in case when the first and second friction materials 50 and 52 are not bonded to the core material 54, sufficient torques will be applied on both surfaces of the second friction material 52 to be transmitted to the brake assembly B owing to the spring load of the coned disc spring 31 in combination with the friction coefficient of the second friction material, so that no trouble will occur from the standpoint of its structure.

The core material 54 is an annular product made of steel plate, and its diameter is approximately same as those of the first and second friction materials 50 and 52. The core material is disposed in such a manner as sandwiched in between the both friction materials 50 and 52 to form the friction flange 100.

The core material 54 has a large-diameter hole 56 at its center. Projections 58 which extend inwardly in axial directions are provided integrally on the large-dia. hole 56 at four places, for example. The tip end of the projection 58 is bent to form a claw 60. Further, recessions 64 are formed on a hub 62. The recessions 64 are formed at positions corresponding to those of the projections 58 on an outer peripheral part of the hub 62.

Figure 8:
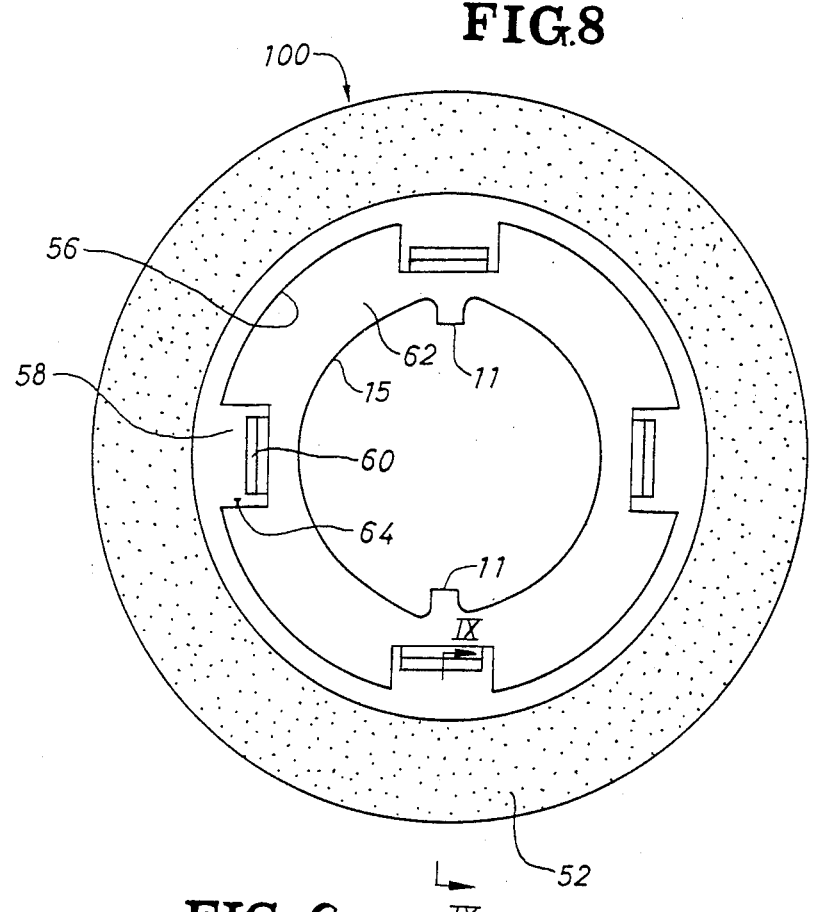
FIG. 8 is a second friction member side schematic front elevation of a friction frange of FIG. 7.

As shown by FIG. 8, the projection 58 meshes with the claw 60 with a play left in the recession 64. Accordingly, the hub 62 rotates integrally with the friction flange 100. Further, the spring load of the coned disc spring 31 urges the friction flange 100 toward the cover 24 through the friction plate 17.

According to the above-mentioned structure, when the release bearing 2 presses the clutch brake A toward the transmission 4 side (FIG. 4) under the clutch disengaged state, friction torques will be generated between the cap 5 and the friction facing 29 and between the release bearing 2 and the friction facing 30. These friction torques are transmitted from the inside surface of the cover 24 to the first friction material 50, and from the cover 19 through the coned disc spring 31 and the friction plate 17 to the second friction material 52. Therefore, the braking torque is actuated through the brake assembly B on the input shaft 3 in the same manner as the embodiment of FIG. 1 even in case of the embodiment of FIG. 7, so that the inertia is braked to ease the shifting of gear. Even in this case, no hindrance is placed in the use of the coned disc spring 31. Consequently, the characteristic curve of the friction allowance of friction material M in relation to the torque T as described in FIG. 6 can be obtained even in the embodiment of FIG. 7. Moreover, according to the structure of FIG. 7, the friction member is composed of the combination of the first friction material 50 rubbing against the inside surface of the cover 24 and the second friction material 52 rubbing against the friction plate 17, so that a selection range of the material can be widened and its cost can be decreased. Furthermore, friction coefficients of the first and second materials 50 and 52 are made larger than conventional ones, thereby the spring load of the coned disc spring 31 can be set to a lower value. Since deformations of the covers 19 and 24 can therefore be prevented, the covers 19 and 24 do not inflate in the axial direction and chattering of the hub 62 between the both covers 19 and 24 can be avoided so that meshing ability of the hub 62 can be improved.

In addition, a surface pressure on the friction washer 17 becomes small and a service life of the friction washer 17 can be prolonged.

What is claimed is:

1. A clutch brake having a brake assembly interconnected to a rotatable shaft through means of driving function and a cover assembly provided with an external friction surface and carried rotatably in relation to said brake assembly; characterized by that a coned disc spring is interposed in said cover assembly, and a friction plate composing said cover assembly is pressed on a friction member composing said brake assembly by means of said coned disc spring.

2. A clutch brake as set forth in claim 1, in which projections extending outwardly in radial directions are formed at plural places on an outer peripheral part of the friction plate, and these projections are fitted in holes of the cover assembly to connect the friction plate to the cover assembly so that they can rotate integrally.

3. A clutch brake as set forth in claim 1, in which a friction material composing the friction member is made of a sintered material and formed into an approximately annular shape.

4. A clutch brake having a brake assembly interconnected to a rotatable shaft through means of driving function and a cover assembly provided with an external friction surface and carried rotatably in relation to said brake assembly; characterized by that a coned disc spring is interposed in said cover assembly, a friction member composing said brake assembly is pressed by the coned disc spring through a friction plate which is a part of said cover assembly, projections extending outwardly in radial directions are formed at plural places on an outer peripheral part of the friction plate, these projections being fitted in holes of the cover assembly to connect the friction plate to the cover assembly so that they can rotate integrally, a friction material composing the friction member is made of a sintered material and formed into an approximately annular shape, the friction material being directed to a cover internal surface facing on a release bearing, and said friction plate and the coned disc spring are interposed in this order from the friction plate side in between the friction material and the cover internal surface facing on a transmission.

5. A clutch brake having a brake assembly interconnected to a rotatable shaft through means of driving function and a cover assembly provided with an external friction surface and carried rotatably in relation to said brake assembly; characterized by that a coned disc spring is interposed in said cover assembly, an approximately annular friction flange composing said brake assembly is pressed by the coned disc spring through a friction plate which is a part of said cover assembly, said friction flange being formed of an approximately annular core material and of first and second friction materials fastened to both outer peripheral surfaces of the core material, claws extending into an approximately L-shape are formed at plural equally spaced positions on circumference of an inner peripheral part of the core material, and these claws are fitted in recessions of a hub which is a part of said brake assembly.

6. A clutch brake as set forth in claim 5, in which the core material is made of a steel plate having a high heat resistance and a high shock resistance, and the first and second friction materials bonded to the both surfaces of the core material are made of a hard organic material having a high friction coefficient.

7. A clutch brake having a brake assembly interconnected to a rotatable shaft through means of driving function and a cover assembly provided with an external friction surface and carried rotatably in relation to said brake assembly; characterized by that a coned disc spring is interposed in said cover assembly, an approximately annular friction flange composing said brake assembly is pressed by the coned disc spring through a friction plate which is a part of said cover assembly, the friction flange is formed of an approximately annular core material and of first and second friction materials fastened to both outer peripheral surfaces of the core material, claws extending into an approximately L-shape are formed at plural equally spaced positions on circumference of an inner peripheral part of the core material, these claws being fitted in recessions of a hub which is a part of said brake assembly, the core material being made of a steel plate having a high heat resistance and a high shock resistance, the first and second friction materials bonded to the both surfaces of the core material being made of a hard organic material having a high friction coefficient, the first friction material being directed to a cover internal surface facing on a release bearing, and said friction plate and the coned disc spring are interposed in this order from the friction plate side in between the second friction material and the cover internal surface facing on a transmission.

* * * * *